June 5, 1951   B. RICHEY ET AL   2,555,934
LIME SPREADING ATTACHMENT FOR TRUCKS
Filed Sept. 26, 1946   2 Sheets-Sheet 1

Inventors
James Schofield
Bert Richey,

By Clarence A. O'Brien
and Harvey B. Jacobson
Attorneys

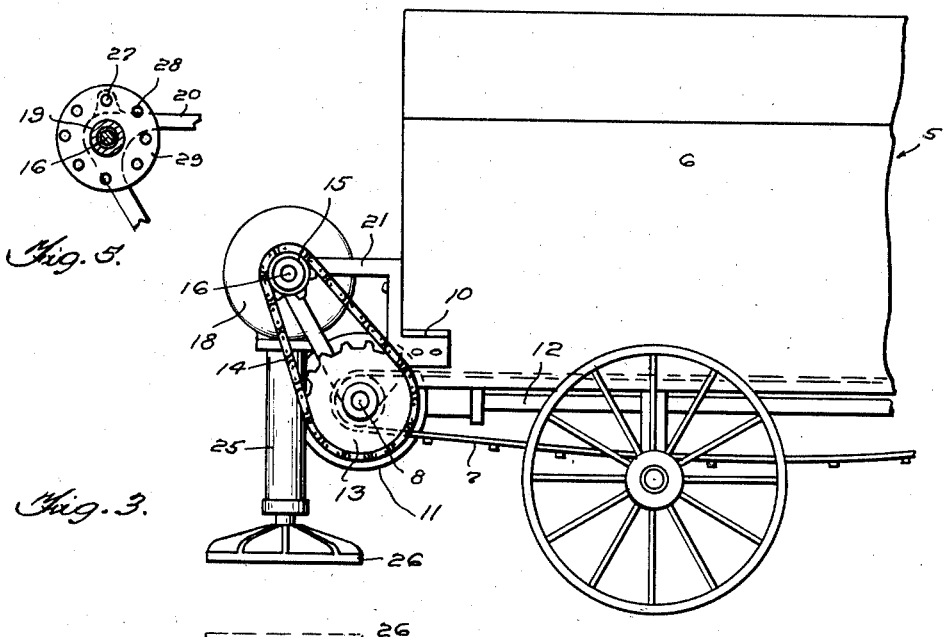
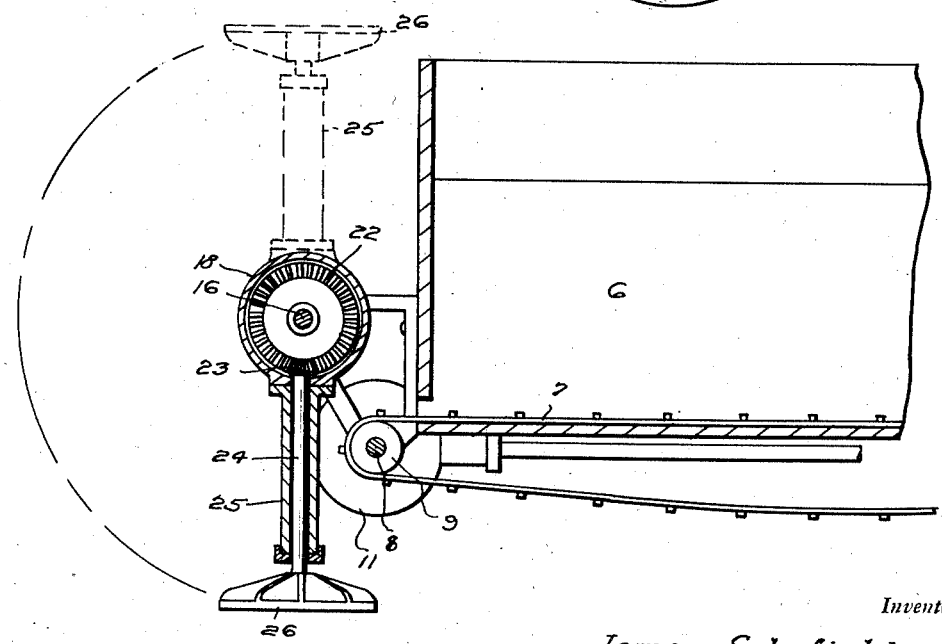

Patented June 5, 1951

2,555,934

UNITED STATES PATENT OFFICE 2,555,934

LIME SPREADING ATTACHMENT FOR TRUCKS

Bert Richey and James Schofield, Carrier Mills, Ill.

Application September 26, 1946, Serial No. 699,530

2 Claims. (Cl. 275—8)

The present invention relates to new and useful improvements in attachments for spreading lime and other fertilizer and more particularly to a device of this character adapted for attaching at the rear end of a truck body equipped with an endless discharge conveyor whereby the conveyor is utilized for delivering the lime or fertilizer onto a rotary scattering device of the spreader attachment.

An important object of the present invention is to provide a spreading attachment of this character including a rotary scatterer operatively connected with the drive mechanism of the endless conveyor for the truck.

A still further object is to provide a scattering attachment which may be swung vertically into an out-of-the-way position to enable use of the truck for other purposes.

An additional object of the invention is to provide an attachment of this character of simple and practical construction, which is efficient and reliable in use, relatively inexpensive to manufacture and install in operative position on a conventional form of truck and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a side elevational view;

Figure 4 is a longitudinal sectional view taken on the line 4—4 of Figure 1, and Figure 5 is a fragmentary sectional view taken on the line 5—5 of Figure 1.

Figure 1:
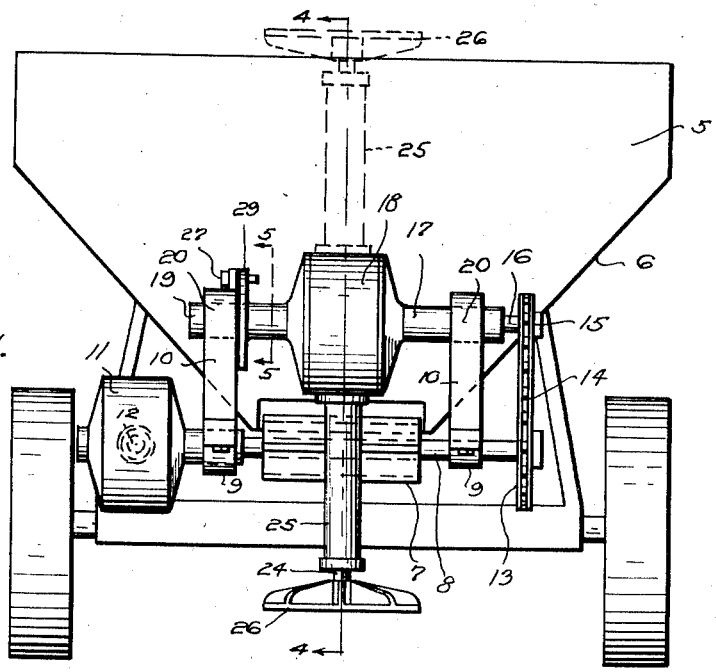
Figure 1 is a rear elevational view.
Figure 2:
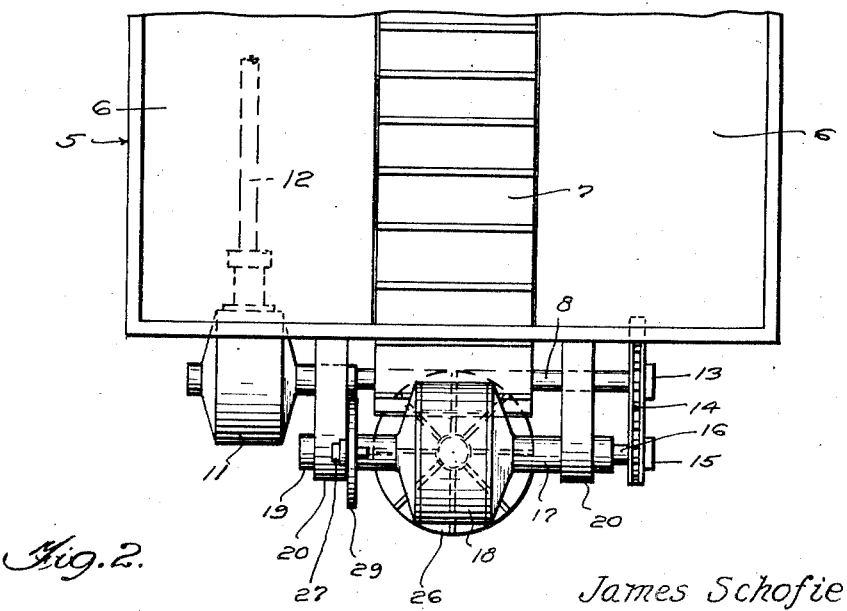
Figure 2 is a fragmentary top plan view of the rear end of the truck showing the attachment in position thereon.

Referring now to the drawings in detail wherein for the purposes of illustration we have disclosed a preferred embodiment of the invention, the numeral 5 designates a truck body of conventional construction formed with inwardly sloping sides 6 and provided at its bottom with a conventional form of endless conveyor 7 for travelling longitudinally along the bottom of the truck to deliver the contents thereof at the rear of the truck.

The conveyor 7 is driven by a rear transverse shaft 8 journaled in bearings 9 supported by brackets 10 attached to the rear of the truck body, one end of the shaft extending into a gear housing 11 for operative engagement with a forwardly extending drive shaft 12 by means of conventional form of gearing (not shown). The drive shaft 12 is driven from a conventional form of power take-off operated by the power plant (not shown) of the truck.

To the other end of the shaft 8 is secured a sprocket 13 driving a chain 14 extending upwardly over a sprocket 15 of reduced ratio and which is secured to one end of an upper transverse shaft 16.

The shaft 16 is journaled in hollow trunnions or shaft housings 17 and 19 fixed to opposite faces of a gear housing 18, the housings 17 and 19 being pivotally supported in bearings 20 secured by brackets 21 to the rear of the truck body 5.

A ring gear 22 is positioned in the gear housing 18 and is secured to the shaft 16, the ring gear driving a pinion gear 23 on the upper end of a shaft 24 which is journaled in a housing 25 extending downwardly from the gear housing 18. To the lower end of the shaft 24 is secured a rotary scatterer 26 of conventional construction, the scatterer being positioned under the delivery end of the conveyor 7. As more clearly shown in Figure 4 pinion 23 will travel around ring gear 22 when shaft 24, shaft housing 25 and scatterer 26 are swung upwardly from the position shown by full lines to the raised position shown by dotted lines. During this raising or lowering movement of the scatterer 26, the shaft housings 17 and 19 turn in the bearings 20, while gear housing 18 rotates approximately 180°.

In the operation of the device the shaft 8 is driven by the power take-off of the truck through the drive shaft 12 and the shaft 8 is used for driving the shaft 16 by way of the sprocket 13, chain 14 and sprocket 15 to thus rotate the scatterer 26 by way of the shaft 24, pinion gear 23 and ring gear 22 secured to the shaft 16. The gear ratio of the sprockets 13 and 15 provide for a rotation of the scatterer at an increased rate of speed whereby to effectively scatter the lime or other fertilizer over the ground.

The scatterer 26 and shaft housing 25 are locked in their downwardly extending position by means of a pin 27 carried by one of the bearings 20 and selectively received in openings 28 in a flange 29 secured to the shaft housing 19. By removing the pin 27 the scatterer 26 and shaft housing 25 may be raised upwardly into the dotted line position as shown in Figure 1 of the drawings by reason of the pivotal mounting of the shaft housings 17 and 19 in the bearings 20 and the scatterer secured in its raised position by again inserting the pin 27 in one of the openings 28. The truck body 5 and conveyor 7 may then be used in the usual manner independently of the scattering attachment.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What we claim as our invention is:

1. A fertilizer distributor comprising in combination, a vehicle unloading conveyor including a transverse power operated shaft at its delivery end, a second transverse shaft at the delivery end of the conveyor, drive means connecting said shafts to each other, a gear housing having fixed thereto hollow trunnions projecting from opposite sides thereof and in which said second transverse shaft is journaled, means rotatably supporting the trunnions at the delivery end of the conveyor for rotation of the housing on a horizontal axis, a ring gear in the housing secured to said second transverse shaft, a vertical shaft housing fixed to and projecting radially from the gear housing, a vertical shaft journaled in said vertical shaft housing, a pinion gear secured to the upper end of the vertical shaft and engaging the ring gear, a scatterer secured to the lower end of said vertical shaft for swinging movement therewith from a lower position beneath the delivery end of the conveyor to a raised position above the conveyor, and locking means carried by the trunnion supporting means and engaging one of the trunnions for locking the scatterer in its raised or lowered position, said pinion gear being adapted to travel bodily around the ring gear by a manual swinging raising or lowering movement of the vertical shaft and vertical shaft housing and the scatterer when the latter is unlocked.

2. A fertilizer distributor comprising in combination, a vehicle unloading conveyor including a transverse power operated shaft at its delivery end, a second transverse shaft at the delivery end of the conveyor, drive means connecting said shafts to each other, a gear housing having fixed thereto hollow trunnions projecting from opposite sides thereof and in which said second transverse shaft is journaled, means rotatably supporting the trunnions at the delivery end of the conveyor for rotation of the housing on a horizontal axis, a ring gear in the housing secured to said second transverse shaft, a vertical shaft housing fixed to and projecting radially from the gear housing, a vertical shaft journaled in said vertical shaft housing, a pinion gear secured to the upper end of the vertical shaft and engaging the ring gear, a scatterer secured to the lower end of said vertical shaft for swinging movement therewith from a lower position beneath the delivery end of the conveyor to a raised position above the conveyor, a flange carried by one of the trunnions having circularly arranged openings, and a locking pin carried by a stationary part of the distributor and selectively engaged in said openings to hold the scatterer in a desired swingably adjusted position, said pinion gear being adapted to travel bodily around the ring gear by a manual swinging raising or lowering movement of the vertical shaft and vertical shaft housing and the scatterer when the latter is unlocked.

BERT RICHEY.
JAMES SCHOFIELD.

REFERENCES CITED

The following references are of record in the file of this patent:

UNITED STATES PATENTS

| Number | Name | Date |
| --- | --- | --- |
| 809,046 | Collins | Jan. 2, 1906 |
| 990,335 | Cantwell | Apr. 25, 1911 |
| 2,010,287 | Anderson | Aug. 6, 1935 |
| 2,126,121 | Luellen | Aug. 9, 1938 |
| 2,340,657 | Goertzen | Feb. 1, 1944 |